United States Patent
Huang et al.

(10) Patent No.: US 8,257,850 B2
(45) Date of Patent: Sep. 4, 2012

(54) BATTERY COVER STRUCTURE

(75) Inventors: Lucas Huang, Shenzhen (CN); Lee-Han Ng, Shenzhen (CN); Chien-Chun Huang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 533 days.

(21) Appl. No.: 12/534,310

(22) Filed: Aug. 3, 2009

(65) Prior Publication Data

US 2010/0055552 A1 Mar. 4, 2010

(30) Foreign Application Priority Data

Aug. 29, 2008 (CN) .......................... 2008 1 0304299

(51) Int. Cl.
*H01M 2/02* (2006.01)
*H01M 2/04* (2006.01)
*H01M 2/10* (2006.01)
(52) U.S. Cl. ........................ 429/96; 429/100; 429/163
(58) Field of Classification Search ............ 429/96–100, 429/163, 175–176, 187
See application file for complete search history.

(56) References Cited

U.S. PATENT DOCUMENTS

| | | | | |
|---|---|---|---|---|
| 5,539,463 A * | 7/1996 | Morikawa et al. | ............ | 348/375 |
| 6,177,950 B1 * | 1/2001 | Robb | ................ | 348/14.01 |
| 7,107,084 B2 * | 9/2006 | Duarte et al. | ............... | 455/575.3 |
| 2002/0186978 A1 * | 12/2002 | Tanaka et al. | ................. | 396/539 |
| 2004/0053120 A1 * | 3/2004 | Lee et al. | .......................... | 429/97 |
| 2004/0229114 A1 * | 11/2004 | Liang et al. | .................... | 429/100 |
| 2005/0250532 A1 * | 11/2005 | Hwang et al. | ............... | 455/550.1 |

FOREIGN PATENT DOCUMENTS

JP 09306457 A * 11/1997
JP 2002270141 A * 9/2002

OTHER PUBLICATIONS

Machine Translation of JP 09-306457 (Nov. 1997).*
Machine Translation of JP 2002-270141 (Sep. 2002).*

\* cited by examiner

*Primary Examiner* — Basia Ridley
*Assistant Examiner* — Jacob Buchanan
(74) *Attorney, Agent, or Firm* — Altis Law Group, Inc.

(57) ABSTRACT

A battery cover structure includes a cover, a main housing, a supporting member and two connecting members. One end of the cover is rotatably attached to the main housing. The main housing defines a recess. The supporting member is received in the recess of the main housing, with one end of the supporting member being rotatably attached to the main housing. The supporting member defines a cavity for receiving a battery and defines two guiding holes at two opposite sides thereof. One end of the connecting member is rotatably attached to the cover, and the other end is slidably and rotatably engaged in the guiding hole of the supporting member. When the cover is opened, the supporting member is raised by the connecting members.

16 Claims, 4 Drawing Sheets

BATTERY COVER STRUCTURE

BACKGROUND

1. Technical Field

The present disclosure relates to portable electronic devices, particularly, to a battery cover structure for use in a portable electronic device.

2. Description of Related Art

Potable electronic devices such as mobile phones, personal digital assistants, etc., generally have main bodies and battery covers. A portable electronic generally includes a battery cover structure, which is used to attach the battery cover to the main body. In a conventional portable electronic device, the battery cover needs to be detach from the main body to replace a battery. After replacing the battery, a person may forget to reattach the cover, as a result the cover may be lost.

Therefore, there is room for improvement within the art.

BRIEF DESCRIPTION OF THE DRAWINGS

Many aspects of the battery cover structure can be better understood with reference to the following drawings. The components in the drawings are not necessarily drawn to scale, the emphasis instead being placed upon clearly illustrating the principles of the battery cover structure, in which.

DETAILED DESCRIPTION OF THE EMBODIMENTS

Figure 1:
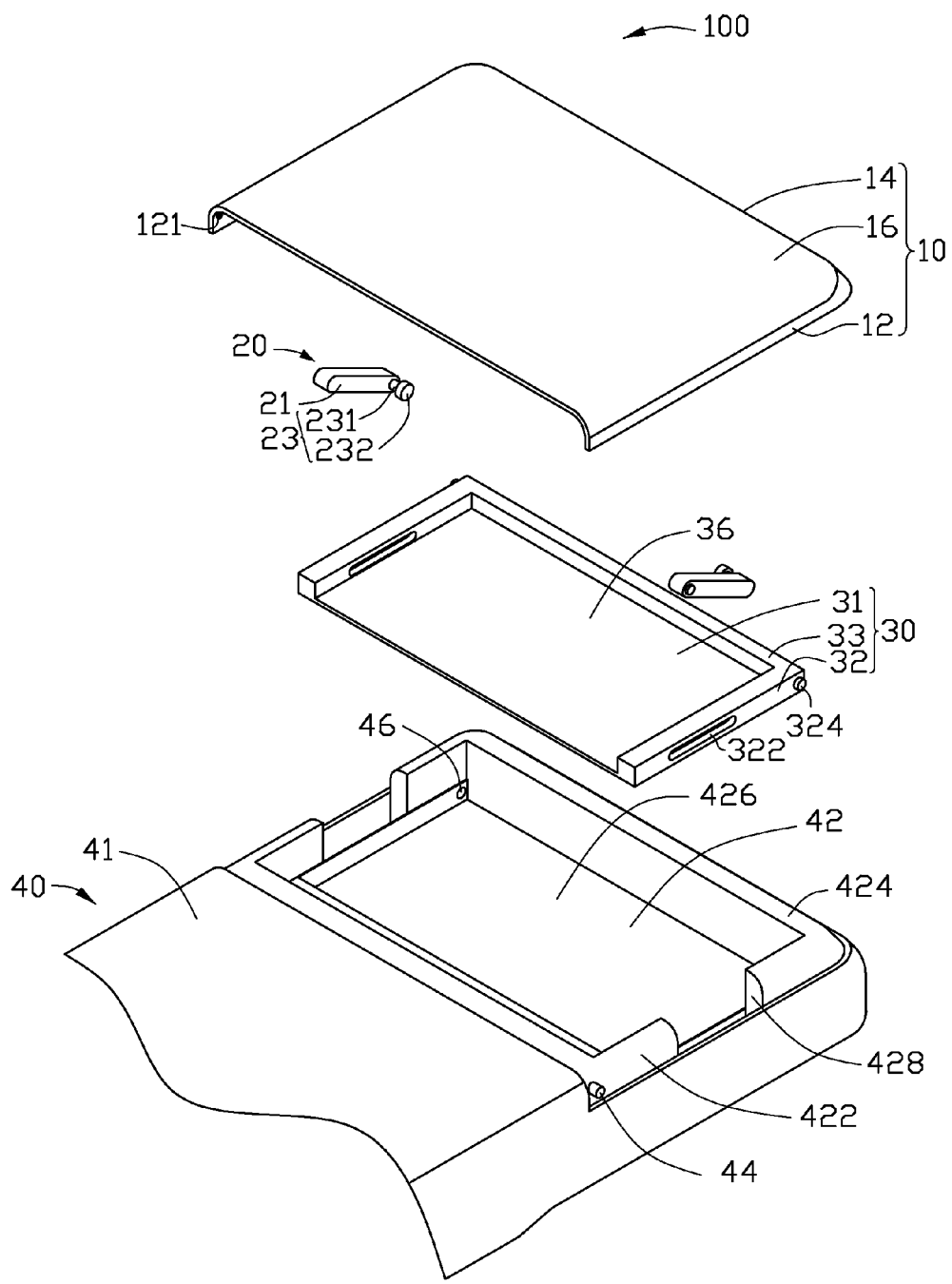
FIG. 1 is an exploded, schematic view of a battery cover structure therein, in accordance with an exemplary embodiment.
Figure 2:
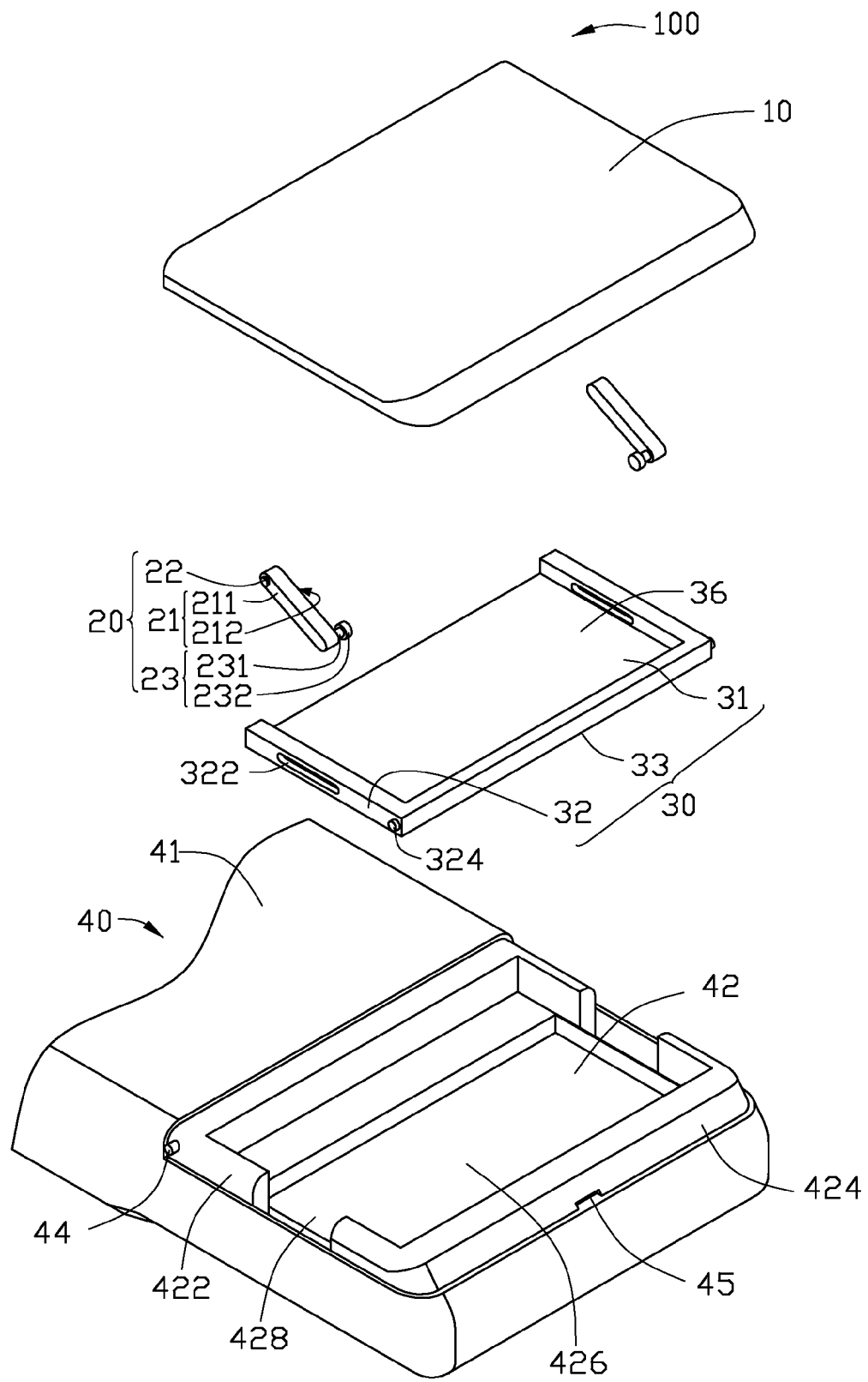
FIG. 2 is similar to FIG. 1, but showing another aspect.

Referring to FIGS. 1-2, a battery cover structure 100 is applied to a portable electronic device (not labeled), in accordance with an exemplary embodiment. The battery cover structure 100 includes a cover 10, two connecting members 20, a supporting member 30 and a main housing 40.

Figure 3:
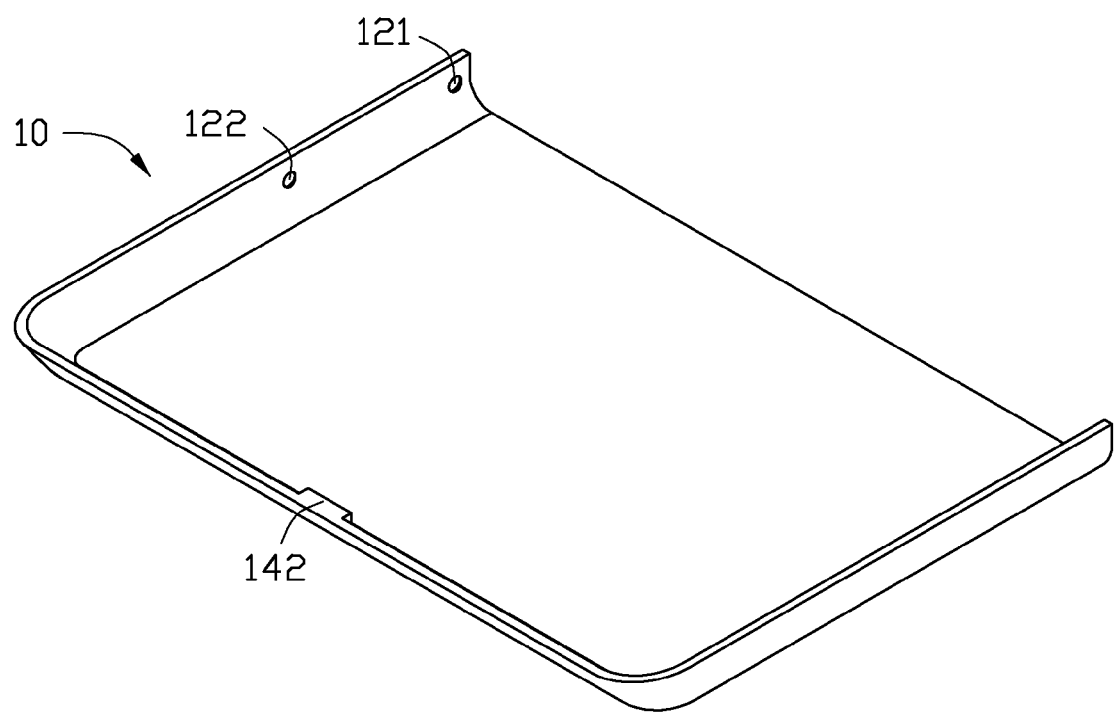
FIG. 3 is a schematic view of a cover showing in FIG. 1.

The cover 10 includes two first side walls 12, a second side wall 14 and a bottom board 16. The two first slide walls 12 are on opposite sides of the cover 10. The second side wall 14 connects the two first side walls 12. Each first side wall 12 defines a shaft hole 122 and a pivot hole 121 (FIG. 3). A projection 142 protrudes toward the bottom board 16 at a middle portion of the second side wall 14.

Each connecting member 20 includes a main body 21. A sliding portion 23 is positioned at one end of the main body 21, and a shaft 22 is positioned at another end of the main body 21. The sliding portion 23 and the shaft 22 are integrally formed with the main body 21. The sliding portion 23 includes a connecting shaft 231 and a head 232. The connecting shaft 231 connects the main body 21 and the head 232. The head 232 is column-shaped. The main body 21 includes a first surface 211 and a second surface 212 on another side of the 21 opposite to the 211. The shaft 22 extends from the first surface 211, and the connecting shaft 231 of the sliding portion 23 extends from the second surface 212.

The supporting member 30 includes a main section 31, two first bars 32, and a second bar 33. The two first bars 32 are formed on opposite sides of the main section 31, and the second bar 33 is formed at one end of the main section 31. The second bar 33 connects with the two first bars 32. The first bars 32, the second bar 33 and the main section 31 cooperatively form a cavity 36 for receiving a battery (not shown). Each first bar 32 defines a guiding hole 322 receiving the head 232 of the connecting member 20. The head 232 of the connecting member 20 is slidable into the guiding hole 322. Two posts 324 correspondingly extend from two ends of the second bar 33 perpendicular to the first bars 32.

The main housing 40 has a top surface 41, and defines a recess 42 in the top surface 41. The recess 42 is defined in a rear end of the main housing 40, for receiving the supporting member 30. The recess 42 forms two sidewalls 422, two end walls 424, and a bottom surface 426. Each sidewall 422 defines a gap 428 in a middle portion and a round hole 46 in one end. The connecting members 20 are receivable in the gaps 428. The round hole 46 is adjacent to the end wall 424 and the bottom surface 426. The round hole 46 can receive the post 324 of the supporting member 30. A pivot 44 extends from another end of each sidewall 422, away from the bottom surface 426. The pivot 44 is configured for engaging in the shaft hole 122 of the cover 10. The end wall 424 at rear of the main body defines a groove 45 in a middle portion. The positioning of the groove 45 (in the middle portion) allows the projection 142 to be receivable in the groove 45.

Figure 4:
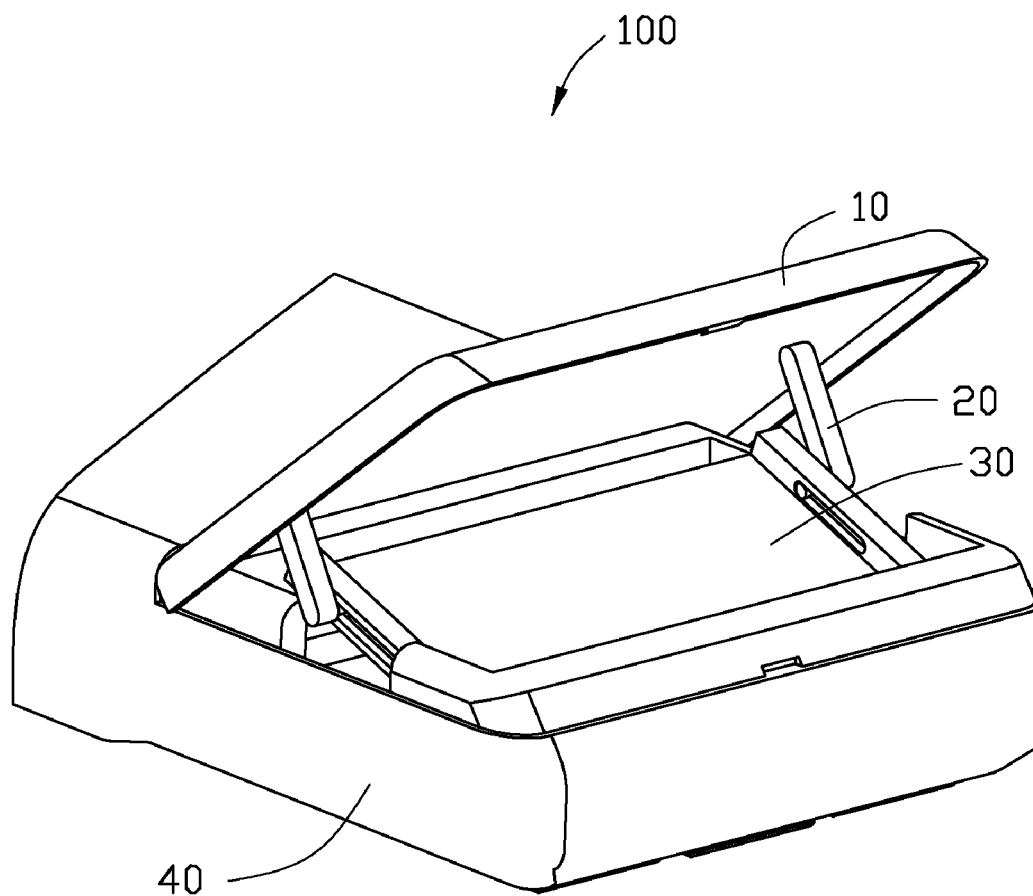
FIG. 4 is an assembled, schematic view of the battery cover structure shown in FIG. 1.

In assembly of the battery cover structure 100, also referring to FIG. 4, the posts 324 of the supporting member 30 are correspondingly engaged in the round holes 46 of the recess 42, so that the supporting member 30 is rotatably attached to the main housing 40. Each connecting member 20 is then rotatably attached to the cover 10 by engaging the shaft 22 in the shaft hole 122 of the cover 10. The sliding portion 23 of each connecting member 20 is slidably engaged in the guiding hole 322. The cover 10 is rotatably attached to the main housing 40 by engagement of the pivot hole 121 and the pivot 44 of the main housing 40.

When the battery is to be replaced, the cover 10 is raised via the groove 45 at one end of the main housing 40. The cover 10 rotates relative to the pivot 44 of the main housing 40. The connecting members 20 move up following the rotation of the cover 10 correspondingly, such that, one end of each connecting member 20 rotates relative to the shaft 22, and another end slides in the guiding hole 322 toward the pivot 44 of the main housing 40. The supporting member 30 is pushed up by the connecting members 20, while the supporting member 30 rotates relative to the post 324 thereof. Thus, the battery received in the cavity 36 of the supporting member 30 is raised and can be easily removed. When a replacement battery is inserted in the cavity 36 of the supporting member 30, the cover 10 is pressed down. The sliding portion 23 of each connecting member 20 slides toward the post 324 in the guiding hole 322 of the supporting member 30. When the projection 142 of the cover 10 engages in the groove 45 of the main housing 40, the supporting member 30 is pushed down, and each connecting member 20 is received in the corresponding gap 428 of the sidewall 422.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover structure comprising:
   a cover including two first side walls at two sides thereof, and each first side wall defining a shaft hole and a pivot hole;
   a main housing, a pivot extending from each side of the main housing, the pivots being received in the pivot holes for rotatably connecting one end of the cover to the main housing, the main housing defining a recess;
   a supporting member received in the recess of the main housing, with one end of the supporting member being rotatably attached to the main housing, the supporting member defining a cavity for receiving a battery and defining two guiding holes at two opposite sides thereof; and
   two connecting members, one end of both of the connecting members including a shaft being rotatably attached to each shaft hole of the cover, and the other end being slidably and rotatably engaged in the guiding holes of the supporting member.

2. The battery cover structure as claimed in claim 1, wherein each of the two connecting members further comprises a sliding portion at another end thereof, and the sliding portion is slidably and rotatably engaged in the guiding hole of the supporting member.

3. The battery cover structure as claimed in claim 2, wherein each of the two connecting members has a first surface and an opposite second surface, the shaft extends from the first surface, and the sliding portion extends from the second surface.

4. The battery cover structure as claimed in claim 3, wherein the sliding portion of the connecting member comprises a connecting shaft and a head, and the head is engaged in the guiding hole of the supporting member.

5. The battery cover structure as claimed in claim 1, wherein the supporting member comprises a main section, two first bars and a second bar, the first bars are positioned at two opposite sides of the main section, the second bar connects the two first bars, the first bars, the second bar and the main section cooperatively form the cavity, and the guiding holes are respectively defined in the first bars.

6. The battery cover structure as claimed in claim 5, wherein the recess of the main housing comprises two first sidewalls and a second sidewall, each first sidewall defines a round hole, two posts extend from two ends of the second bar of the supporting member, and the supporting member is rotatably attached in the recess of the main housing by engagement of the posts and the round holes.

7. The battery cover structure as claimed in claim 6, wherein each sidewall of the recess defines a gap at a middle portion thereof for receiving the connecting member.

8. The battery cover structure as claimed in claim 1, wherein the supporting member includes a first end and a second end, the cover rotates around the pivots relative to the main housing, the connecting members move up following the rotating of the cover so that the shafts of the connecting members rotate in the shaft holes, and the other end slides in the guiding holes toward the pivots of the main housing, the supporting member with the battery rotates together around the first end relative to the main housing, and the second end of the supporting member is raised to replace the battery.

9. A battery cover structure comprising:
   a cover including two first side walls at two sides thereof, and each first side wall defining a shaft hole and a pivot hole;
   a main housing defining a recess, a pivot extending from each side of the main housing, the pivots being received in the pivot holes for rotatably connecting the cover to the main housing;
   a supporting member received in the recess of the main housing, the supporting member being rotatably attached to the main housing, the supporting member defining a cavity for receiving a battery; and
   two connecting members connecting the cover and the supporting member, one end of each connecting member including a shaft being rotatably attached to each shaft hole of the cover, and the other end of each connecting member being rotatably attached to the supporting member, the connecting members being moved by the cover to raise or lower the supporting member.

10. The battery cover structure as claimed in claim 9, wherein each of the two connecting members further comprises a sliding portion at another end thereof, the supporting member comprises two first bars at two sides thereof, each first bar defines a guiding hole, and the sliding portion is slidably and rotatably engaged in the guiding hole of the supporting member.

11. The battery cover structure as claimed in claim 10, wherein each of the two connecting members has a first surface and an opposite second surface, the shaft extends from the first surface, and the sliding portion extends from the second surface.

12. The battery cover structure as claimed in claim 11, wherein the sliding portion of the connecting member comprises a shaft and a head, and the head is engaged in the guiding hole of the supporting member.

13. The battery cover structure as claimed in claim 9, wherein the supporting member comprises a main section, two first bars and a second bar, the first bars are positioned at two opposite sides of the main section, the second bar connects the two first bars, the first bars, the second bar and the main section cooperatively form the cavity, each first bar defines a guiding hole, and the other end of the connecting member is slidably received in the guiding hole.

14. The battery cover structure as claimed in claim 13, wherein the recess of the main housing comprises two first sidewalls and a second sidewall, each first sidewall defines a round hole, two posts extend from two ends of the second bar of the supporting member, and the supporting member is rotatably attached to the recess of the main housing by engagement of the posts and the round holes.

15. The battery cover structure as claimed in claim 14, wherein each sidewall of the recess defines a gap at a middle portion thereof for receiving the connecting member.

16. The battery cover structure as claimed in claim 9, wherein the supporting member includes a first end and a second end, when the cover rotates around the pivots relative to the main housing, the supporting member with the battery rotates together around the first end relative to the main housing, and the second end of the supporting member is raised by the connecting members to replace the battery.

* * * * *